United States Patent
Dekel (10) Patent No.: US 10,185,415 B2
(45) Date of Patent: Jan. 22, 2019

(54) CONFIGURABLE COMMUNICATION PROTOCOL FOR COMMUNICATION BETWEEN A STYLUS DEVICE AND A HOST DEVICE

(71) Applicant: Microsoft Technology Licensing, LLC, Redmond, WA (US)

(72) Inventor: Shoham Dekel, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/441,410

(22) Filed: Feb. 24, 2017

(65) Prior Publication Data

US 2018/0246587 A1    Aug. 30, 2018

(51) Int. Cl.
G06F 3/038    (2013.01)
G06F 3/0354   (2013.01)
G06F 3/044    (2006.01)

(52) U.S. Cl.
CPC ........ G06F 3/0383 (2013.01); G06F 3/03545 (2013.01); G06F 3/044 (2013.01)

(58) Field of Classification Search
CPC .... G06F 3/038; G06F 3/0383; G06F 3/03545; G06F 3/044; G06F 3/0416
See application file for complete search history.

(56) References Cited

U.S. PATENT DOCUMENTS

| 3,463,911 | A | | 8/1969 | Dupraz et al. |
| 5,428,369 | A | * | 6/1995 | Pranger ................. G06F 3/0312 345/163 |
| 7,426,643 | B2 | | 9/2008 | Homer et al. |
| 7,903,818 | B2 | | 3/2011 | Park et al. |
| 8,094,137 | B2 | | 1/2012 | Morrison |

(Continued)

FOREIGN PATENT DOCUMENTS

EP          1011234 A1    6/2000
EP         26748371 A1   12/2013

(Continued)

OTHER PUBLICATIONS

Qualcomm OnQ Blog; "From LTE to Wi-Fi and back: Call Continuity brings the next generation of calling", Jan. 5, 2015, from https://www.qualcomm.com/news/onq/2015/01/05/lte-wi-fi-and-back-call-continuity-brings-next-generation-calling.*

(Continued)

*Primary Examiner* — Laurence J Lee
(74) *Attorney, Agent, or Firm* — Holzer Patel Drennan (57) ABSTRACT

A stylus device includes circuitry that includes hardware and/or software for configuring a digitizer communication protocol for communicating with a digitizer of a host device. The stylus device communicates with the host device according to a device specified communication protocol. The protocol specification command is received during concurrent communication with the digitizer according to the first communication protocol and indicates a second communication protocol for communicating with the digitizer of the host device. The stylus device generates and transmits a signal to the digitizer of the host device according to the specified second communication protocol. The stylus device is configured to dynamically change communication protocols based on host protocol specification commands.

19 Claims, 7 Drawing Sheets

(56) References Cited

U.S. PATENT DOCUMENTS

| | | |
|---|---|---|
| 8,481,872 B2 | 7/2013 | Zachut |
| 8,971,305 B2 | 3/2015 | Malladi et al. |
| 9,107,239 B2 | 8/2015 | Khandekar et al. |
| 9,329,703 B2 | 5/2016 | Falkenburg et al. |
| 9,335,874 B2 | 5/2016 | Buelow et al. |
| 9,389,709 B2* | 7/2016 | Miller .................. G06F 3/03545 |
| 9,477,350 B2 | 10/2016 | Sheng et al. |
| 9,495,011 B1 | 11/2016 | Lee et al. |
| 9,524,044 B2 | 12/2016 | Zachut |
| 2007/0246539 A1 | 10/2007 | Sandstrom et al. |
| 2008/0169132 A1 | 7/2008 | Ding et al. |
| 2010/0199229 A1 | 8/2010 | Kipman et al. |
| 2012/0242603 A1 | 9/2012 | Engelhardt et al. |
| 2015/0050879 A1 | 2/2015 | MacDuff et al. |
| 2015/0363012 A1 | 12/2015 | Sundara-rajan et al. |
| 2016/0048234 A1 | 2/2016 | Chandran et al. |
| 2016/0195941 A1 | 7/2016 | Gur et al. |
| 2016/0195943 A1 | 7/2016 | Gur et al. |
| 2016/0209940 A1* | 7/2016 | Geller .................... G06F 3/0416 |
| 2016/0337496 A1 | 11/2016 | Gilbert et al. |
| 2016/0357275 A1 | 12/2016 | Ribeiro |
| 2018/0239445 A1* | 8/2018 | Barel .................... G06F 3/0383 |

FOREIGN PATENT DOCUMENTS

| | | |
|---|---|---|
| WO | 2014088659 A1 | 6/2014 |
| WO | 2016189322 A1 | 12/2016 |
| WO | 2017004506 A1 | 1/2017 |

OTHER PUBLICATIONS

Pandya, K, "Comparative Study on Wireless Mobile Technology: 1G, 2G, 3G, 4G and 5G", Sep. 2015, International Journal of Recent Trends in Engineering & Research, vol. 1, Issue 1, p. 26.*

Lee, et al., "Haptic Pen: A Tactile Feedback Stylus for Touch Screens", In Proceedings of the 17th annual ACM Symposium on User Interface Software and Technology, Oct. 24, 2004, pp. 291-294.

Reeve, Whitham D., "Telecommunications Synchronization Overview" In Reeve Engineers, File: Synchronization.doc, Issue 1, Aug. 6, 2002 pp. 1-21.

Imanilov, Benjamin, "Multi-Protocol Communications Between Host Devices and Stylus Devices", U.S. Appl. No. 15/605,369, filed May 25, 2017, 39 pages.

Malik, et al., "A Signature Verification Framework for Digital Pen Applications", In Proceedings of 10th IAPR International Workshop on Document Analysis Systems, Mar. 27, 2012, pp. 419-423.

* cited by examiner

CONFIGURABLE COMMUNICATION PROTOCOL FOR COMMUNICATION BETWEEN A STYLUS DEVICE AND A HOST DEVICE

BACKGROUND

Touch-sensor-integrated pens interact with a grid of capacitive-touch electrodes that exist below an electronic display. A touch-sensor-integrated pen can be further classified as a passive stylus or an active stylus (e.g., an active pen).

The passive stylus utilizes sensing methods based on changes in the capacitive coupling between sensor electrodes deposited on a touch-screen sensor and an input object, such as a rubber-tipped stylus or figure. For example, electrical signals communicated through a set of conductive transparent electrodes deposited on one axis of the touch-screen sensor, while synchronized sensing of electrical signals takes place on a perpendicular set of electrodes. While a passive stylus can work well for human-touch detection, this solution may be less effective when fine tip pens are used. Also, challenges exist in distinguishing a passive stylus from fingernails and other fine user touches.

In contrast, active styluses drive unique modulated signals between the tip of the stylus to a grid of electrodes (e.g., a digitizer) and utilize sensing methods based on changes in the capacitive coupling between sensor electrodes. In these devices, sensing may take place on both axes simultaneously, with the received magnitudes being proportional to the tip proximity to the electrodes. Some active styluses may work in combination with a display that also supports touch-sensing. For example, the modulated content-rich signals of the active styluses may be received orthogonal to the touch signals to facilitate differentiation between passive sensing and touch-sensing.

SUMMARY

Implementations described herein include a stylus device configured to communicate with a digitizer of the host device. The stylus device includes a digitizer signal transceiver configured to communicate with the digitizer of the host device using a first device specified communication protocol. The stylus device further includes a receiver configured to receive a protocol specification command indicating a second communication protocol for communicating with the digitizer of the host device. The protocol specification command indicates a second communication protocol for communicating with the digitizer of the host device. The protocol specification command is received during concurrent communication with the digitizer of the host device according to the first communication protocol. The digitizer signal transceiver further configured to communicate with the digitizer of the host device using the second communication protocol.

Implementations described herein further include a method for communicating between a stylus device and a digitizer of a host device. The method includes communicating with the digitizer of the host device using a first device specified communication protocol. The method further includes receiving a protocol specification command indicating a second communication protocol for communicating with the digitizer of the host device. The protocol specification command received during concurrent communication with the digitizer of the host device according to the first communication protocol. The method further includes communicating with the digitizer of the host device according to the second communication protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTIONS

Some electronic computing devices include a display with a built-in digitizer to sense signals transmitted from a stylus device, such as an active stylus or another signal-emitting device or device accessory. In these electronic devices, a user interacts with the digitizer system by positioning and moving the stylus device over a sensing surface of the system, e.g., a tablet and/or a touch screen. The position of the stylus device with respect to the sensing surface is tracked by the digitizer system and interpreted as a user command. In some technologies, position of the stylus device can be determined based on detection of capacitive coupling between an electrode of the stylus device and one or more electrodes of the digitizer. For example, the device display may include a digitizer with a plurality of X and Y oriented conductors or a resistive film to receive signals transmitted from the electrode of the active pen. To accurately identify tip position, the transmitting electrode is, in some technologies, physically positioned within a writing tip of the stylus device.

Stylus devices may generate a modulated signal that may be detectable by the digitizer. The modulated signal may be generated based on a communication protocol and may be intermittently repeated. The signal may be about 15 ms in duration, but may be shorter or longer in various implementations. The signal may be encoded with information such as the device identification, operational mode or capabilities (e.g., writing, erasing), pressure information, tilt information, and other information. The information may be allocated to various portions of the signal. For example, the device identification is encoded in a first portion of the signal, the operational mode is encoded in a second portion of the signal, and the pressure information is encoded in a third portion of the signal.

Such information is detectable by the host system (e.g., tablet, smart phone) and used to provide functionality in the display of the host system. For example, the host device detects a stylus that is in writing mode with identifiable pressure information. The host system can use that information (in combination with position information detected through the digitizer) to display digital ink with the thickness dependent on the pressure information encoded in the signal. The digitizer of the host system may be configured to sample the detected signals in certain increments. The digitizer sampling rate may be synchronized with the length of signal of the stylus device. In addition, stylus devices may be specifically configured to work with certain host devices (e.g., particular manufacturers). As such, a signal duration and composition may be configured to work with digitizers of certain host devices. The signal may be static, in that it repeats the same information in the same manner (e.g., the same information is allocated to the same portions of a 15 ms communication protocol) because a digitizer may be configured to detect such a communication protocol.

Because a stylus device signal is generally generated according to a static communication protocol, stylus devices are generally configured to work with a certain digitizer, device operating system, and/or manufacturer. Furthermore, because the signal is generated according to the static communicating protocol, the stylus device's identification can be cloned.

Implementations described herein provide a stylus device configurable to communicate with one or more digitizers in multiple protocols. The stylus device is configured to receive a protocol specification command from a host device. The protocol specification command indicates a communication protocol for communicating with the digitizer of the host device. The stylus device generates and transmits a signal to the digitizer of the host device according to the indicated communication protocol. The stylus device and the digitizer host device are further configured to dynamically change communication protocols, providing an additional layer of security. For example, the host device may iteratively, intermittently, or continually command the stylus device to change communication protocols while the devices are concurrently communicating using a previously commanded communication protocol. Furthermore, the host device may indicate transmission windows for communicating using the indicated protocols. These and other implementations are further described below with respect to the figures.

Figure 1:
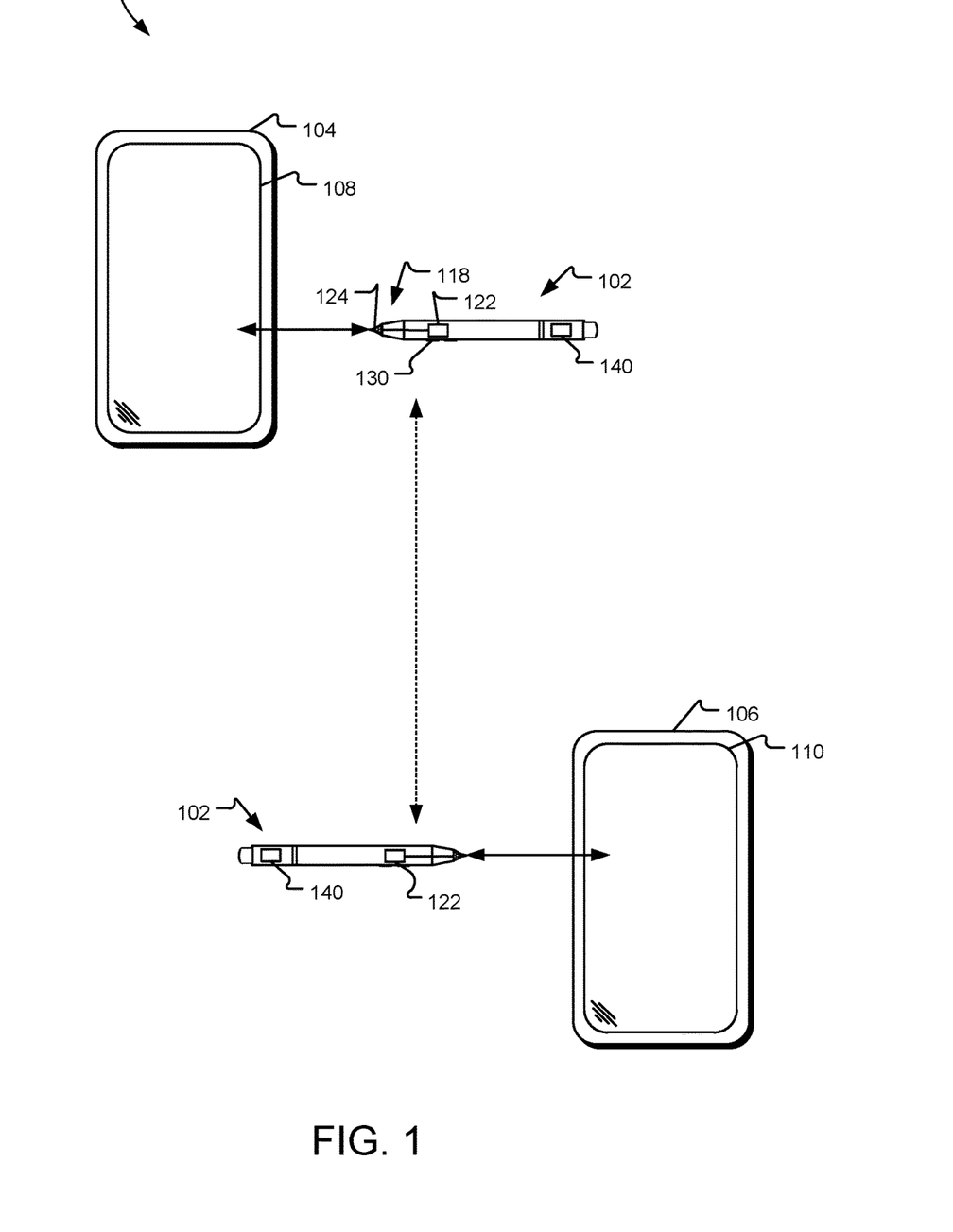
FIG. 1 illustrates an example system including a stylus and host devices.

FIG. 1 illustrates an example system 100 including a stylus device 102 and host devices 104 and 106. The host computing devices 104 and 106 include displays 108 and 110 that are integrated with respective digitizer sensors (not shown).

The digitizer sensors may include rows and columns of conductive strips that are electrically coupled to a digitizer controller (not shown) and operative to detect an electromagnetic signal emitted by the stylus device 102. In some implementations, the conductive strips are further operative to detect an input from a human finger, hand, or other objects, by capacitively coupling with such objects. The capacitive coupling is, for example, sensitive to the presence of conductive objects, such as fingertips. In other implementations, the digitizer sensor is formed with a matrix of electrode junctions that are not constructed based on rows and columns of conductive strips.

Referring now to host device 104, the digitizer controller of the host device 104 manages and controls stylus-based detection, communication, and, in applicable implementations, finger-based detection. Together, the digitizer sensor and the digitizer controller form a digitizer system. During stylus-based detection, outputs from the digitizer sensor are sampled to detect a signal transmitted by the stylus device 102 and to determine the coordinates of a writing tip 118 of the stylus device 102 relative to the digitizer sensor. The digitizer controller performs actions such as processing signals received by the stylus device 102 and determining the coordinates of the writing tip 118.

The stylus device 102 is also referred to herein as an "active stylus" because it includes electrical components, such as a digitizer signal transceiver 122 that controls generation of a signal for communication with a host device digitizer. For example, the digitizer signal transceiver 122 may include a signal generator comprising integrated circuits (ICs) configured to encode information generated, stored, or sensed by the stylus device 102 on the signal transmitted by the stylus device 102. In implementations, the digitizer signal transceiver 122 includes a decoder for decoding protocol specification commands. The digitizer signal transceiver 122 may, for example, include one or more application-specific integrated circuits ("ASICs"), one or more system on chips ("SOCs"), and/or one or more programmable intelligent computers ("PICs"), etc. In one implementation, the signal generated by the digitizer signal transceiver 122 is transmitted by one or more electrodes (e.g., an electrode 124) electrically coupled to the digitizer signal transceiver 122. In operation, the electrode 124 is a signal-emitting electrode that transmits a signal to the digitizer of the stylus enabled host device 104 or 106. As described in greater detail below, the signal can be used to identify the position, orientation, operational mode, pressure, etc. of the stylus device 102 at a given point in time. In the illustrated implementation, the writing tip 118 acts as the electrode 124, but it should be understood that the electrode 124 and the writing tip 118 may be separate elements of the stylus device 102.

The stylus device 102 may be any type of pointing device usable with a host device such as the host devices 104 and 106. Such stylus devices may be usable by disabled persons for controlling and/or communicating with any number of host devices. The stylus devices 102 may be usable to select and/or actuate certain functionalities on a host device. Other types of stylus devices are contemplated.

In some exemplary implementations, the stylus device 102 operates by periodically transmitting a signal based on a communication protocol. The signal may be detected by the digitizer sensor of the host device 104 or 106. The stylus device 102 may include one or more sensor(s) for collecting and identifying various position and orientation parameters, such as applied pressure, tilt, rotation, etc. For example, the stylus device 102 may be pressure sensitive and include a pressure sensor among sensor(s) for sensing pressure applied to the writing tip 118. In another implementation, the stylus device 102 includes a tilt sensor among sensor(s) for detecting a tilt of the stylus relative to the plane of the digitizer sensor.

Information collected by the sensor(s) can be transmitted to the host device 104 in various ways. In one implementation, the digitizer signal transceiver 122 includes an encoder, which encodes information sensed by the sensor(s) (e.g., pressure, tilt, etc.) onto the generated signal. The stylus device 102 may also periodically transmit other information related to the stylus device 102, the environment around the stylus device 102, to a user using the stylus device 102, capabilities of the stylus device 102, or information received from a third-party device. Additional information related to the stylus may, for example, include indications of a pressed button(s) (e.g., a button 130 that changes operational modes), identification, manufacturer, version, media access control (MAC) address, and stored configurations such as color, tip type, brush, and add-ons. Various information collected by the sensor(s) may be allocated to specific portions of the generated signal. For example, the stylus identification information may be encoded in a first portion of the signal, operational mode information (e.g., write, erase) may be encoded in a second portion of the signal, etc. The stylus device 102 is configured such that the communication protocol and various information encoded in the signal according to the protocol can be varied depending on the host device (e.g., the host devices 104 and 106).

In some exemplary implementations, the stylus device 102 includes a wireless communication unit 140 that is configured to receive signals from various host devices, such as the host devices 104 and 106. The wireless communication unit 140 may receive signals from the host device 104 or 106 via, without limitation, BlueTooth, Wi-Fi, haptic transmission, infrared (IR), radiofrequency (RF) communication, or BlueTooth low energy (BlueTooth LE). In operation, the stylus device 102 monitors receipt of a signal from the host devices 104 and/or 106. For example, the wireless communication unit 140 may receive a protocol specification command from the host device 104 or 106 that indicates communication protocol for communication with the digitizer sensor of the host device 104 or 106. In various implementations, the protocol specification command may be received at the digitizer signal transceiver 122 from the digitizer of the host device 104 or 106. The wireless communication unit 140 and/or the digitizer signal transceiver 122 may include a decoder for decoding protocol specification commands. The digitizer signal transceiver 122 (e.g., a signal generator) is configured to generate the signal according to the communication protocol. The signal is encoded with information based on the communication protocol. The signal is then periodically communicated to the digitizer of the host device 104 or 106 when the stylus device 102 is in proximity of the host device 104 or 106.

The communication protocol for communication between the stylus device 102 and the host devices 104 and 106 may be stored in a memory (not shown) on the stylus device 102. The communication protocol may be defined by one or more parameters indicated by the communication specification command. The protocol specification command received by the stylus device 102 may indicate communication protocol parameters that define signal characteristics. The parameters may include a radiofrequency (RF) of the generated signal, a duration of a transmission window, a duration of the signal transmission, a number of transmission cycles in the transmission window (e.g., a number of signals sent), a number of clocks added to the transmission cycles, and phase of the signal. If the stylus device 102 is assigned a particular transmission window, the stylus device 102 may repeat its signal (encoded with device ID and operational information) a number of times within the window. Thus, the number of repetitions in the window is the number of transmission cycles in the transmission window. The number of clocks added to the transmission cycle represents a period of time after each transmission cycle, providing a buffer period in clock units. The protocol specification command may also indicate a phase shift of the generated signal. For example, the stylus may be assigned a phase shift of 180 degrees.

The protocol specification command may be received in a specified "command window" of a signal communicated by the host device. For example, the protocol specification command may be encoded in a 4 ms portion of a signal. In other implementations, the protocol specification command is encoded in a 15 ms portion of the signal. In various implementations, the specified window may be dynamically changed. For example, a first protocol specification command may indicate a transmission window that may be used to subsequently indicate a second communication protocol. Thus, the stylus device is configured to detect the second communication protocol during the previously indicated transmission window.

Furthermore, the protocol specification command may indicate a window for responding to the protocol specification command to confirm receipt of the command. For example, the host device may indicate to the stylus device confirm receipt of a protocol specification command in a specific window of a generated signal using an indicated protocol. Thus, the stylus device may be constantly (or repeatedly) confirmed or verified.

Furthermore, the protocol specification command received by the stylus device 102 may indicate how information is be encoded in the generated signal. For example, instead of encoding the device ID in a first portion of the signal, the device ID may be encoded in a last portion of the signal. Other information including, without limitation, date, time, pressure information, tilt, and the operational mode, may be assigned different portions of the signal by the protocol specification command.

The digitizer controller of a host device (e.g., the host device 104) controls the sampling rate of the such that the sampling rate corresponds with the communication protocol parameters communicated shared with the stylus 102. The digitizer receives the signal output by the stylus device 102 and decodes the signal according to the communication protocol parameters. The controller then generates an output, which may include various information such as coordinates of the writing tip 118 of the stylus device 102, orientation (e.g., pen-up or pen-down status) of the writing tip 118, pressure applied to the writing tip 118, and additional information provided by the stylus device 102 (e.g., pressure, tilt, battery level, and operational mode). Such information may be used by the device to generate digital ink and provide additional functionality for the host device 104.

The digitizer controller may use both analog and digital processing to process signals detected by the digitizer sensor. The controller may transmit the information received from the digitizer sensor to an application manager or a relevant application, such as an application stored in memory of the host device 104 or 106 and executable by a processor of the host device 104 or 106.

Because the stylus device 102 is configured to generate the signal according to the communication protocol received from a host device (e.g., host devices 104 and 106), the stylus device 102 is configurable to work with multiple types of devices that may be configured for different operating systems, functionalities, manufactures, etc. As such, the stylus device 102 may reconfigure or may be able to switch communication protocols depending on which host device the stylus device 102 is communicating with. In various implementations, the stylus device 102 is able to detect proximity to a host device and configure the communication protocol according to the proximal device. For example, the stylus device 102, when in proximity to the host device 104, may transmit according to a communication protocol for the digitizer of the host device 104, and when in proximity to the host device 106, may transmit a communication protocol according for the digitizer of the host device 106.

In various implementations, the stylus device 102 may dynamically change the communication protocol when communicating with a single host device. For example, when communicating with the host device 104, the stylus device 102 may dynamically change the communication protocol.

As such, the host device 104 may indicate two or more communication protocols (e.g., communication protocol parameter sets) and a switch condition. As such, the stylus device 102 may communicate with the host device 104 for a first period using a first communication protocol then communicate using the second communication protocol after the switch condition. The switch condition may be a time period or a number of cycles communicated between the digitizer and the stylus device. Other switch conditions are contemplated.

In various implementations, the stylus device 102 is configured during a setup period, which may be initiated by the stylus device 102 and/or the host device 104 or 106. The setup period may be enabled by pressing (e.g., holding) the button 130 or triggering setup on the host device. During the setup period, the host device may scan for styluses in proximity and send the protocol specification command to a located stylus (e.g., via BlueTooth or through the digitizer). The stylus receives the command, configures itself according to the received communication protocol, and begins communicating with the digitizer of the host device 104 or 106. After a period of time or disconnection, the host device may re-notify the stylus device 102 of the same or another communication protocol with a subsequent protocol specification command. In various implementations, the subsequent protocol specification command may be received from the digitizer using the first communication protocol, from the digitizer using a default communication protocol, or via BlueTooth or other means.

In some exemplary implementations, during the setup period, the host device 104 or 106 transmits a protocol specification command to the stylus device 102, and the stylus device 102 responds to the host device 104 or 106 confirming the ability to communicate in the indicated communication protocol. Such confirmation may be transmitted over the indicated communication protocol or a default protocol. In other implementations, the stylus device fails to respond. In such a scenario, the host device may transmit a second protocol specification command indicating a second (e.g., different) communication protocol. The process may be repeated until the stylus device 102 confirms the communication protocol or begins communicating with the digitizer of the host device 104 or 106 using the indicated communication protocol.

Figure 2:
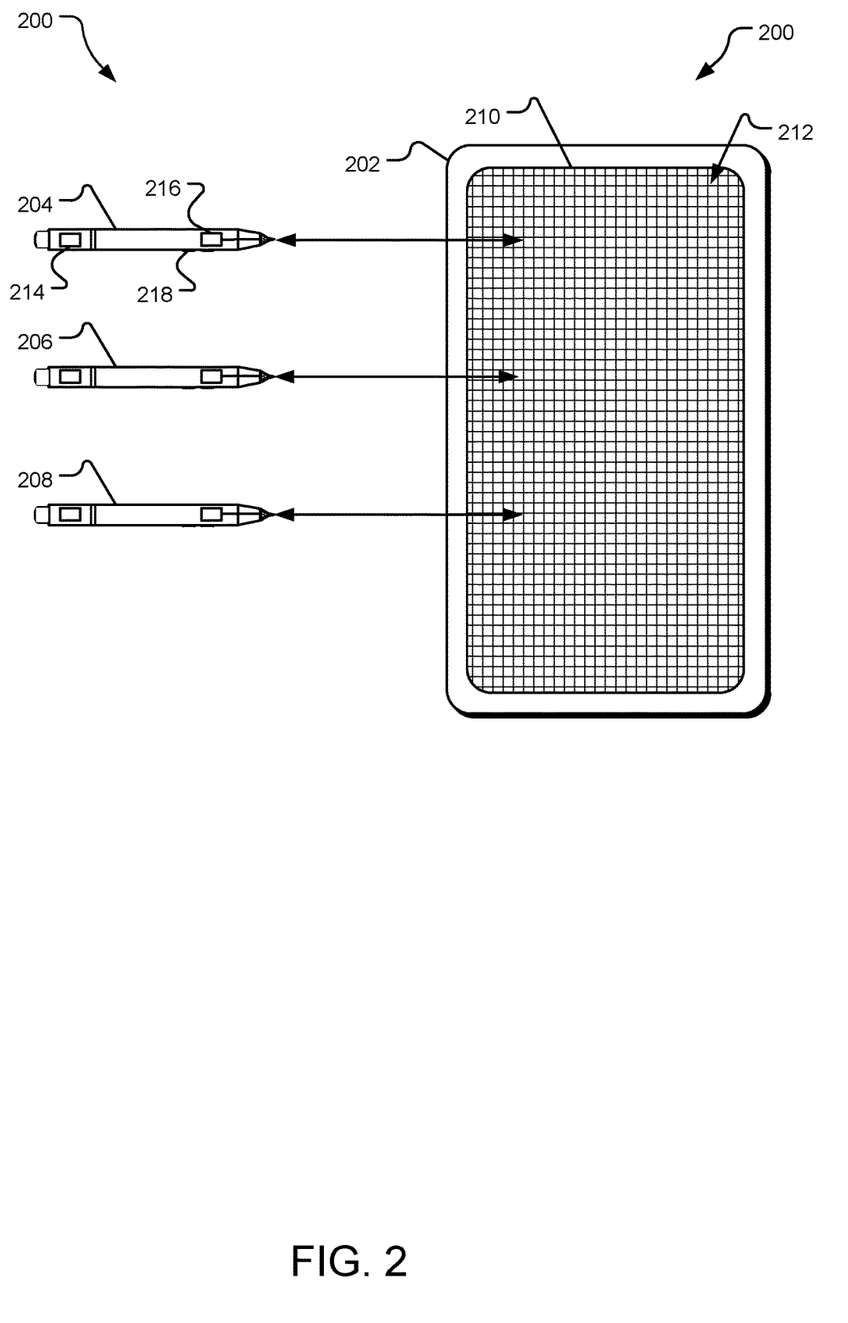
FIG. 2 illustrates another example system including styluses and a host device.

FIG. 2 illustrates an example system 200 including styluses 204, 206, and 208 and a host device 202. The host device 202 includes a display 210 that is integrated with a digitizer sensor 212.

The digitizer sensor 212 may include rows and columns of conductive strips that are electrically coupled to a digitizer controller (not shown) and operative to detect an electromagnetic signal emitted by the styluses 204, 206, and 208. In some implementations, the conductive strips are further operative to detect an input from a human finger, hand, or other objects, by capacitively coupling with such objects. The capacitive coupling is, for example, sensitive to the presence of conductive objects, such as fingertips. In other implementations, the digitizer sensor 212 is formed with a matrix of electrode junctions that are not constructed based on rows and columns of conductive strips.

The styluses 204, 206, and 208 are active styluses that include a variety of electronic components including, without limitation, a wireless communication unit and a digitizer signal transceiver, which includes digitizer signal generator, digitizer signal transmitter, digitizer receiver, etc. For example, the stylus 204 includes a digitizer signal transceiver 216 and a wireless communication unit 214. The styluses 204, 206, and 208 may also include buttons (e.g., a button 218 on the stylus 204) that are operable to trigger different operational modes of the pen (e.g., writing, erasing, color). Each of the styluses 204, 206, and 208 are configured to transmit (via a signal transmitter) a signal according to a communication protocol that may be detectable by the digitizer sensor 212. A transmitted signal may include stylus identifying information, operational mode, tilt information, pressure information, etc. The styluses 204, 206, and 208 may be concurrently used with the host device 202. For example, if a user is using the styluses 204, 206, 208 for a drawing application, each of the styluses 204, 206, and 208 may represent a different color and/or drawing method (e.g., paint brush, pencil).

The host device 202 includes a controller (not shown) that coordinates operation of the styluses 204, 206, and 208. For example, the controller operates to notify each stylus of a communication protocol that it should use for communication with the digitizer sensor 212. The digitizer sensor 212 may have a defined or configurable sample rate. For example, the digitizer sensor 212 may have a sample rate of 45 ms. As such, each of the styluses 204, 206, and 208 may be assigned a portion (e.g., a timeslot) of the sample rate. For example, according to received communication protocols, the stylus 204 is assigned the first 15 ms of the 45 ms sample rate, the stylus 206 is assigned the second 15 ms of the 45 ms sample rate, and the stylus 208 is assigned the last 15 ms of the 45 ms sample rate. Accordingly, the stylus 204 configures itself to generate a signal of 15 ms and synchronizes itself to send the signal the assigned first time slot of the 45 ms sample rate of the digitizer. The signal may include encoded information such as device ID, operational mode, etc. In various implementations, each stylus may be assigned a different length timeslot, which may provide an extra layer of security.

The host device 202 may notify each of the styluses of the communication protocol using any number of methods. For example, the digitizer sensor 212 may notify the styluses 204, 206, and 208 of the communication protocol. In another implementation, the host device 202 uses BlueTooth communication to notify each of the styluses of the communication protocol. The host device may also signal to the styluses 204, 206, and 208 a start time of respective signals such that each stylus is accorded a timeslot of the sample rate of the digitizer sensor 212. In various implementations, the host device 202 may reconfigure the sampling rate of the digitizer sensor 212 such that it may operate with any number of styluses.

In various implementations, the host device 202 is operable to identify a currently used stylus (e.g., the stylus 204, 206, or 208) based on the timeslot within an output of the digitizer sensor, identifying information transmitted by a communication protocol of the stylus, and/or the communication protocol signature itself (e.g., signal characteristics such as length, frequency, phase). The host device 202 may associate the currently used stylus with an operation and/or digital ink characteristic. As noted above, each stylus may be associated with a different color and/or thickness for a drawing application. As such, the host device is operable to recognize the stylus and display the associated characteristic with the stylus is used.

Furthermore, the host device 202 is configured to block and/or enable certain features depending on the stylus identification. For example, the stylus 204 may be usable to digitally sign PDFs while the stylus 206 is blocked from signing PDFs. Because certain styluses may be approved to sign documents while other styluses are blocked from signing documents, digital forgery may be prevented.

In various implementations, the host device 202 may issue a command to any/each of the styluses 204, 206, and 208 indicating two or more communication protocols and a switch condition. For example, stylus 204 may communicate with the digitizer sensor 212 using a first communication protocol until the switch condition is satisfied. After the switch condition is satisfied, the stylus 204 communicates with the digitizer sensor 212 using a second communication protocol. The digitizer sensor is also operable to detect signals using first communication protocol and the second communication protocol and/or alter the sample rate to detect the first and second communication protocols. The use of multiple communication protocols provides an extra security layer, making it difficult to clone or imitate a stylus communication protocol.

Figure 3:
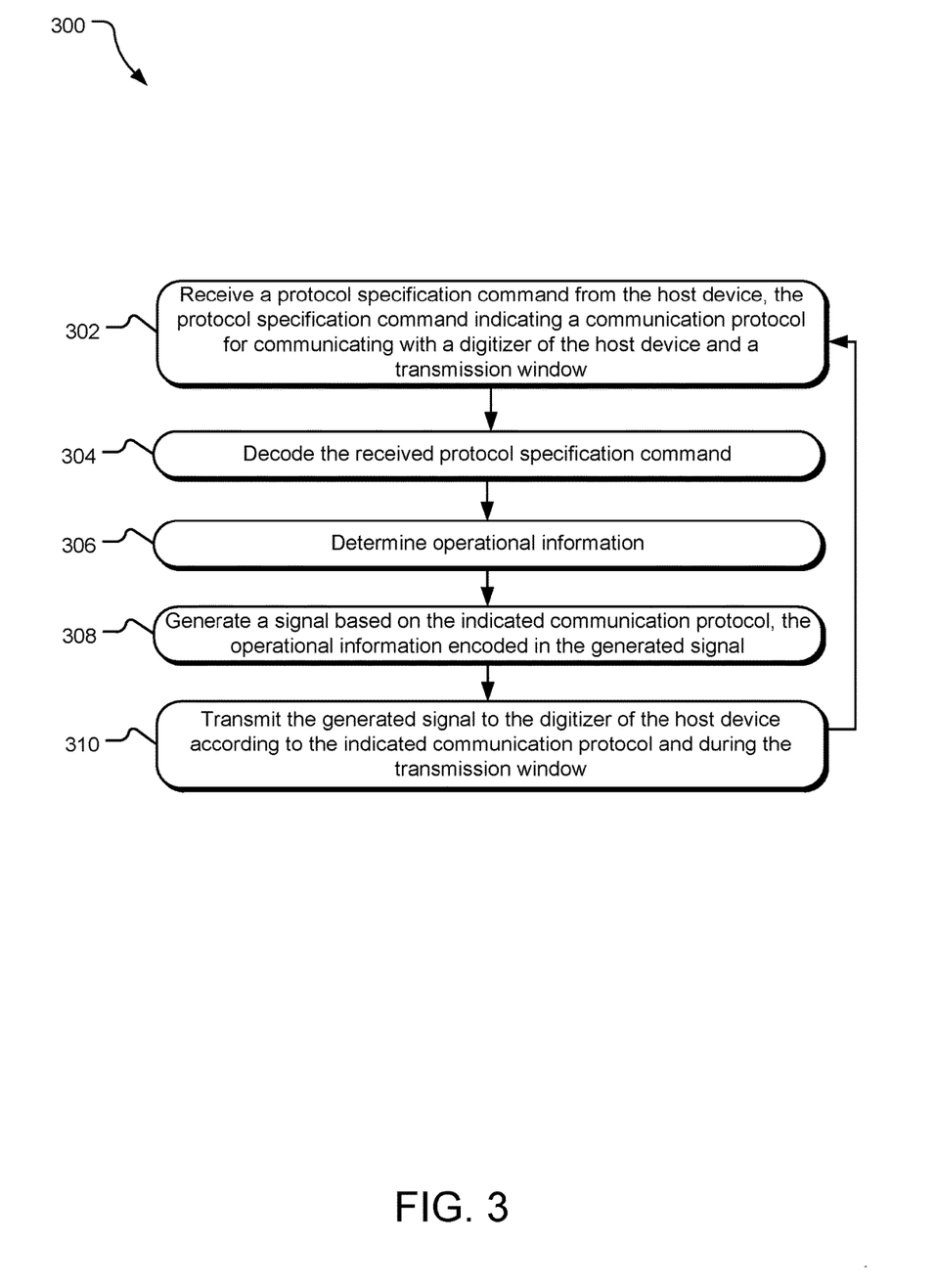
FIG. 3 illustrates example operations for communicating a signal from a stylus device to a digitizer of a host device.

FIG. 3 illustrates example operations 300 for communicating a signal from a stylus device to a digitizer of a host device. A receiving operation 302 receives a protocol specification command and a transmission window from the host device. The protocol specification command indicates a communication protocol for communicating with a digitizer of the host device. The command may be received from a digitizer of the host device, from a BlueTooth transceiver (receiver/transmitter) of the host device, or via another communication protocol from the host device. Thus, the command may be received at a digitizer signal transceiver or a wireless communication unit of the stylus device. A decoding operation 304 decodes the received protocol specification command. The decoding operation 304 may be performed by a decoder in the wireless communication unit of the stylus device or a decoder in the digitizer signal transceiver. A determining operation 306 determines operational information of the stylus. The determining operation 306 may be performed by a sensors module that collects such operational information via sensors (e.g., gyroscope, accelerometer, operational mode buttons, and pressure sensor). Such operational information may include operational mode (e.g., write, erase, select), tilt, acceleration, pressure, etc. A generating operation 308 generates a signal based on the indicated communication protocol. The operational information is encoded in the generated signal. A transmitting operation 310 transmits the generated signal to the digitizer of the host device according to the indicated communication protocol and during the indicated transmission window. The operations 306 to 310 may be continually repeated until the devices are disconnected or until the stylus device receives an additional protocol specification command. As such, the process iteratively repeats and the stylus device continues generating and transmitting a signal according to the communication protocol indicated by the protocol specification command.

In various implementations, the host device transmits an additional protocol specification concurrently while communicating with the stylus device over the first communication protocol. In this implementation, concurrently while communicating with the stylus device means that the stylus device is currently configured to communicate with the digitizer using the first communication protocol. However, the stylus device need not be actively communicating (e.g., currently being used to create digital ink). In other words, the device may be in a resting or not being currently used state. The additional protocol specification command may be received via the first indicated communication protocol or via other wireless transmission protocols (e.g., BlueTooth, Wi-Fi) and indicates a second communication protocol for communicating with the digitizer of the host device. Thus, an additional signal based on the additional protocol specification command is generated and transmitted to the host device allowing dynamic change of communication protocols initiated by the host device. Furthermore, if the host device indicates a transmission window, the stylus device begins to communicate with the digitizer of the host device using the second communication protocol during the transmission window. In some implementations, the host device may change operational capabilities of the stylus device depending on the communication protocol. For example, if the stylus device is using the first communication protocol, then the stylus device may sign documents. If the stylus device is using the second communication protocol, then the stylus device may be blocked from signing documents. Furthermore, if the stylus device fails to communicate using a first or second communication protocol in an indicated window, the stylus device may be blocked or prohibited from performing certain functions (e.g., signing documents).

Figure 4:
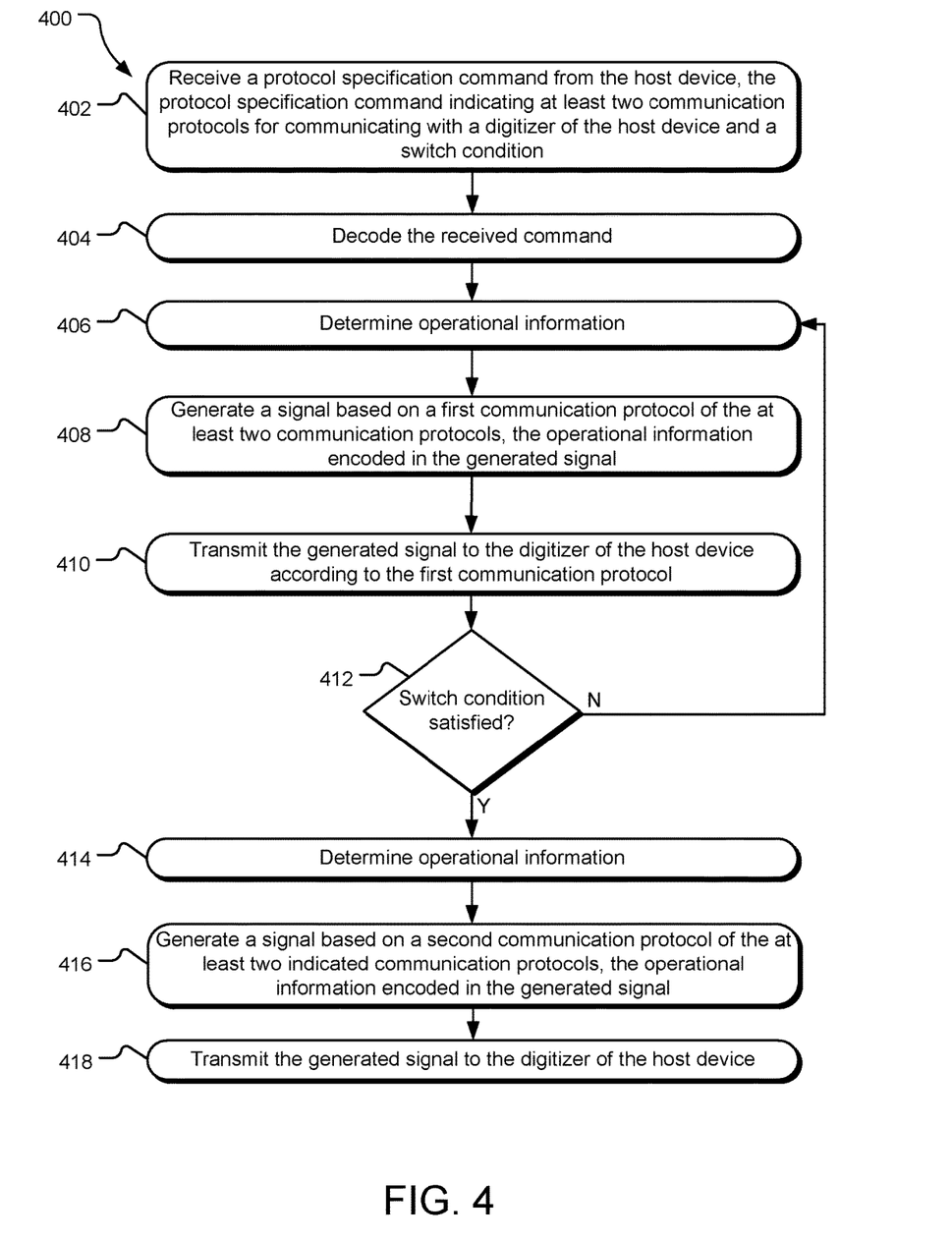
FIG. 4 illustrates example operations for communicating a signal from a stylus device to a digitizer of a host device.

FIG. 4 illustrates example operations 400 for communicating a signal from a stylus device to a digitizer of a host device. A receiving operation 402 receives a protocol specification command from the host device. The protocol specification command indicates at least two communication protocols for communicating with a digitizer of the host device and a switch condition. The command may be received from a digitizer of the host device or from a BlueTooth transceiver of the host device. Thus, the command may be received at a digitizer signal transceiver or a wireless communication unit of the stylus device. A decoding operation 404 decodes the received protocol specification command. The decoding operation 404 may be performed by a decoder in the wireless communication unit of the stylus device or a decoder in the digitizer signal transceiver. A determining operation 406 determines operational information of the stylus. The determining operation 406 may be performed by a sensors module that collects such operational information via sensors (e.g., gyroscope, accelerometer, operational mode buttons). Such operational information may include operational mode (e.g., write, erase, select), tilt, acceleration, etc. A generating operation 408 generates a signal based on a first communication protocol of the at least two indicated communication protocols. The operational information is encoded in the generated signal. A transmitting operation 410 transmits the generated signal to the digitizer of the host device according to the first communication protocol.

A determining operation 412 determines whether the switch condition is satisfied. The switch condition may be based on time (e.g., a duration), the number of communication cycles between the stylus and the host device, etc. If the switch condition is not satisfied, the process returns to determining operation 406 which determines the operational information. The generating operation 408 and the transmitting operation 410 are repeated until the switch condition is satisfied. If the switch condition is satisfied in the determining operation 412, a determining operation 414 determines the operational information such as operational mode, color, pressure, etc. A generating operation 416 generates a signal based on the second communication protocol of the at least two communication protocols. The determined operational information is encoded in the generated signal. A transmitting operation 418 transmits the generated signal to the digitizer of the host device. The operational information may be collected, the signal generated and transmitted until the switch condition is satisfied again. Then, the stylus uses the first communication protocol or another communication protocol. Thus, the stylus dynamically changes between the communication protocols. In various implementations, the host device may transmit an additional protocol specification after a period of time while concurrently communicating with the stylus device using the indicated communication protocol. Thus, an additional signal based on the additional protocol specification command is generated and transmitted to the host device. Furthermore, the host device may iteratively transmit a protocol specification command until a stylus device confirms receipt of the command or begins communicating with the host device using a communication protocol indicated by the command.

Figure 5:
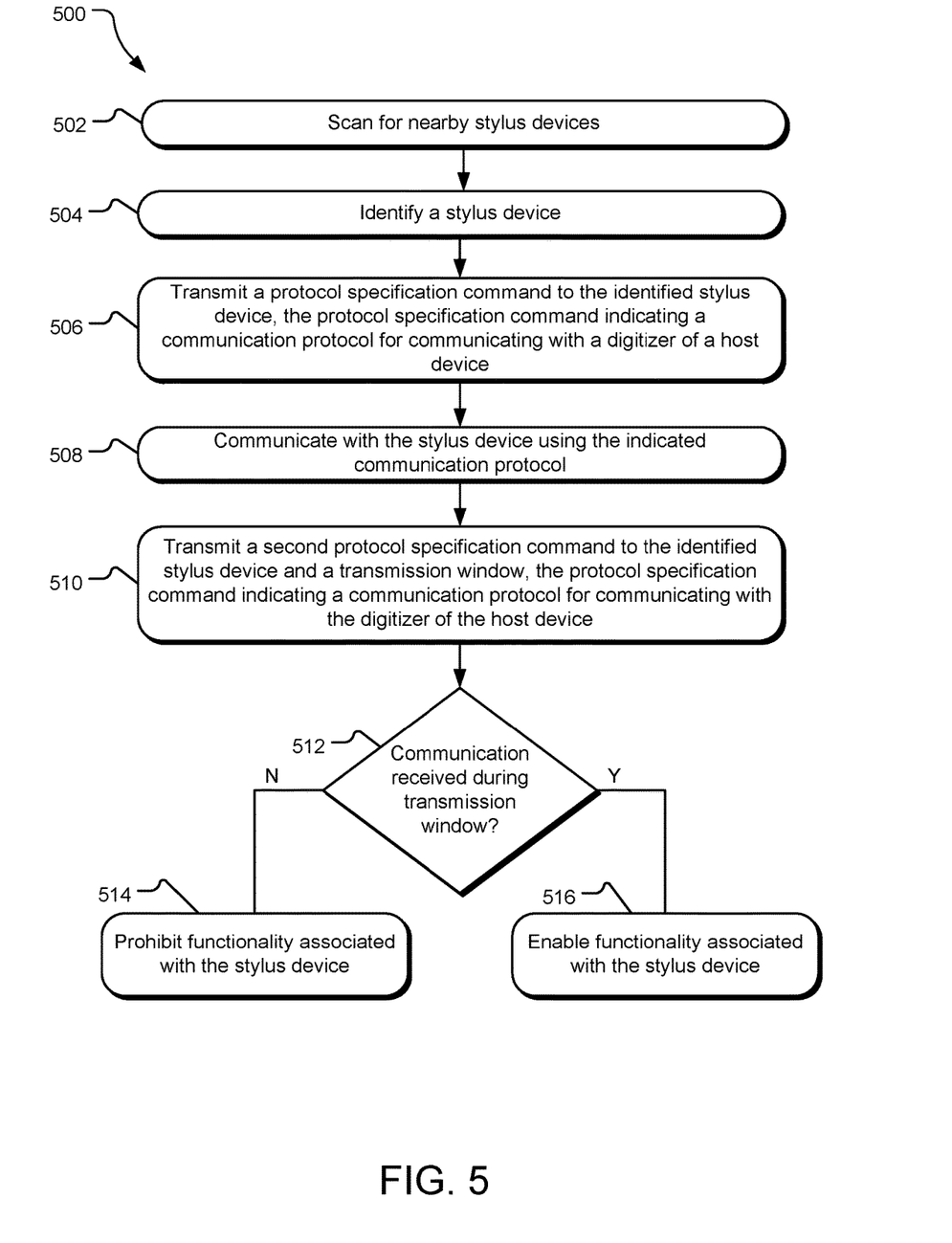
FIG. 5 illustrates example operations for communicating a signal from a digitizer of a host device to a stylus device.

FIG. 5 illustrates example operations 500 for communicating a signal from a digitizer of a host device to a stylus device. The operations 500 may be initiated by activating a setup mode in the stylus device and/or the host device. A scanning operation 502 scans for nearby stylus devices. In the setup mode, the stylus device may periodically transmit a default identification signal which a digitizer or another communication unit of the host device is operable to detect. If the host device detects the presence of a stylus device, an identifying operation 504 identifies the stylus device. Such identification may include identifying a device identification code or signal of the stylus device. A transmitting operation 506 transmits a protocol specification command to the identified stylus device. The protocol specification command indicates a communication protocol for communicating with a digitizer of the host device. The protocol specification command may signal the stylus by including a device ID in the protocol specification command. A communication operation 508 communicates with the stylus using the indicated communication protocol. In order to communicate, the digitizer sample rate may be configurably synchronized with the indicated communication protocol. In other implementations, the digitizer has a static sample rate, and the indicated communication protocol is operable for the digitizer. In implementations, wherein the protocol specification command indicates more than one communication protocol and a switch condition, the digitizer of the host device is configured to monitor satisfaction of the switch condition (e.g., a number of stylus communication cycles, a period of time) and communicate using a subsequent protocol after the switch condition is satisfied.

A second transmitting operation 510 transmits a second protocol specification command to the identified stylus device and a second transmission window. The protocol specification command indicates a communication protocol for communicating with the digitizer of the host device. The second transmitting operation 510 is transmitted concurrently while the host device is communicating with the stylus device according to the first communication protocol (e.g., the host specified communication protocol). In this implementation, concurrently while communicating with the stylus device means that the stylus device is currently configured to communicate with the digitizer using the first communication protocol. However, the stylus device need not be actively communicating (e.g., currently being used to create digital ink). In other words, the device may be in a resting or not being used state. Concurrently also means that the stylus device and the host device have not been disconnected. A determining operation 512 determines whether a communication is received from the stylus device during the transmission window and according to the second communication protocol. If a communication is received during the transmission window and according to the indicated second communication protocol, then an enabling operation 516 enables functionality (e.g., operational capabilities) associated with the stylus device. In other words, if the stylus device is able to reconfigure itself and communicate using the indicated second communication protocol with the right timing (e.g., transmission window), then the stylus device is allowed certain functionality (e.g., signing documents). If a communication is not received during the transmission window or not according to the indicated second communication protocol, a prohibiting operation 514 prohibits functionality associated with the stylus device. In other words, if the stylus device is not able to reconfigure itself and communicate using the indicated second communication protocol with the right timing (e.g., transmission window), then the stylus device is blocked from certain functionality (e.g., signing documents).

Figure 6:
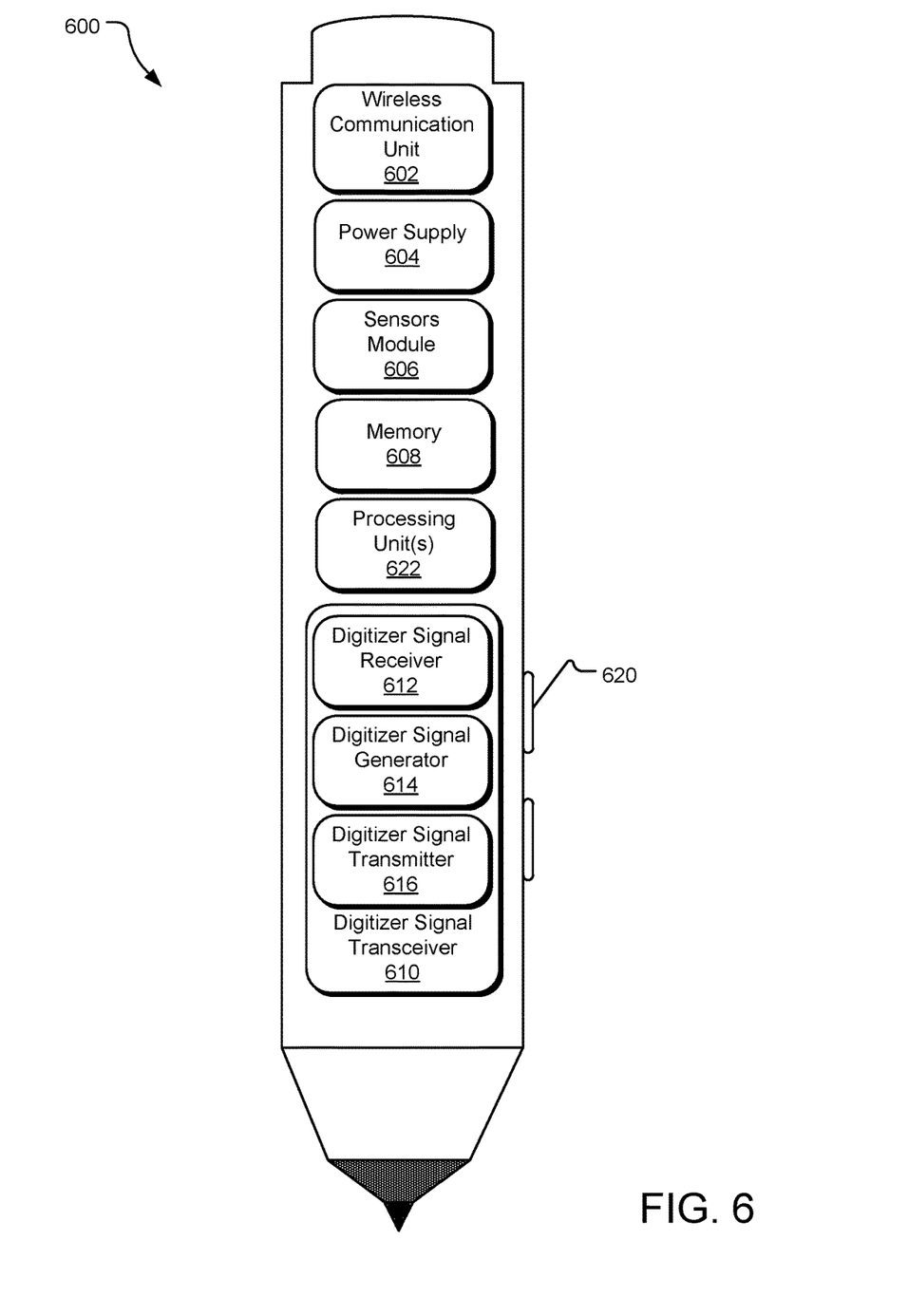
FIG. 6 illustrates an example block diagram of an example stylus device.

FIG. 6 illustrates an example block diagram of an example stylus device 600. The stylus device 600 includes a wireless communication unit 602. The wireless communication unit 602 is configured to communicate with one or more host devices via BlueTooth, Wi-Fi, near field communication, etc. The wireless communication unit 602 may receive protocol specification commands from a host device. The wireless communication unit 602 may include a decoder for decoding protocol specification commands. The stylus device 600 includes a power supply 604, which may comprise a battery for powering the various components of the stylus device 600.

The stylus device 600 further includes a sensors module 606. The sensors module 606 comprises one or more sensors for collecting operational information of the stylus device 600. In various implementations, the sensors module 606 includes sensor and/or circuitry for detecting pressure, tilt, and acceleration. The sensors module 606 also monitors actuation of one or more operational mode buttons (e.g., a button 620) that trigger different operational modes (e.g., write, erase, selection).

The stylus device 600 includes a digitizer signal transceiver 610, which includes hardware, circuitry, and/or instructions stored in a memory 608 of the stylus device 600 and executable by one or more processor units 622 for communicating with a digitizer of a host device. The memory 608 may store one or more communication protocols and other information for communicating with devices. The digitizer signal transceiver 610 includes a digitizer signal receiver 612 for receiving signals from the digitizer of the host device. In various implementations, the digitizer signal receiver 612 receives protocol specification commands from the digitizer of the host device. A digitizer signal generator 614 of the digitizer signal transceiver 610 generates a signal based on a communication protocol indicated by a received protocol specification command. In various implementations, the digitizer signal generator 614 may generate signals for communicating with a digitizer based on a default protocol. A digitizer signal transmitter 616 of the digitizer signal transceiver 610 transmits the generated signal to the digitizer. The digitizer signal transmitter 616 may be an electrode in a tip of the stylus device or located in another part of the stylus device. The various components of the stylus device 600 (e.g., the wireless communication unit 602, the sensors module 606, and the digitizer signal transceiver 610) are communicatively coupled to one another.

Figure 7:
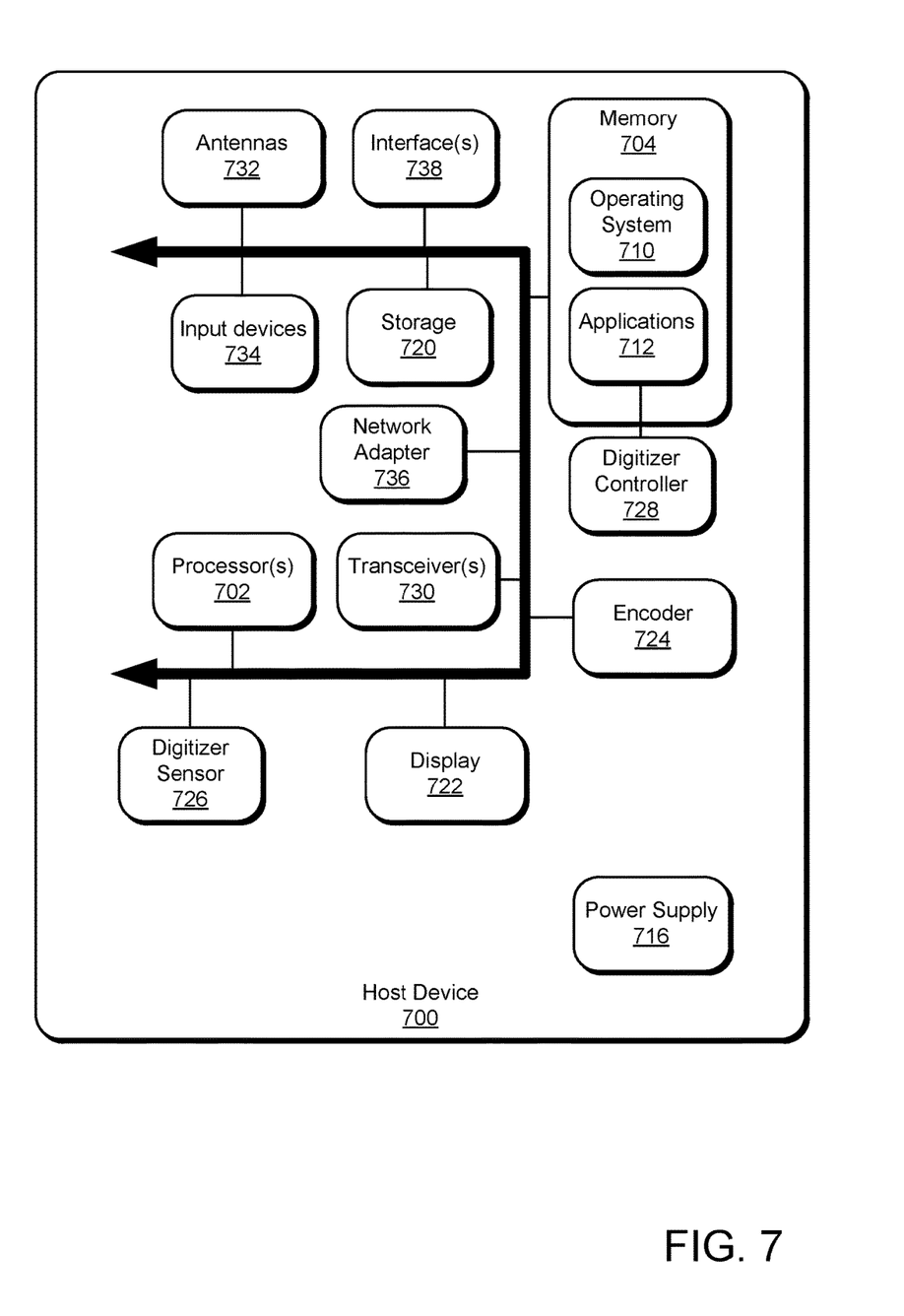
FIG. 7 illustrates an example block diagram of an example host device for utilizing an example stylus device described herein.

FIG. 7 illustrates an example block diagram of an example host device 700 for use in combination with an example stylus device described herein. The device 700 may be a client device such as a laptop, mobile device, desktop, tablet, or a server/cloud device. The device 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor(s) 702.

One or more application programs 712, modules, or segments, such as a drawing application, document editing application, or a digitizer controller 728 are loaded in the memory 704 and/or storage 720 and executed by the processor(s) 702. Data such as communication protocol parameters, stylus identifications, etc. may be loaded into memory 704 or storage 720 and may be retrievable by the processor(s) 702 for use by the applications (e.g., the digitizer controller 728), etc. The storage 720 may be local to the device 700 or may be remote and communicatively connected to the device 700 and may include another server.

The device 700 includes a power supply 716, which is powered by one or more batteries or other power sources and which provides power to other components of the device 700. The power supply 716 may also be connected to an external power source that overrides or recharges the built-in batteries or other power sources.

The device 700 may include one or more communication transceivers 730 to provide network connectivity (e.g., mobile phone network, Wi-Fi, BlueTooth) via the one or more antennas 732 to one or more other servers and/or client devices (e.g., mobile devices, desktop computers, or laptop computers). The device 700 includes a digitizer sensor 726 for communicating with one or more stylus devices and determining location and operational modes of the stylus devices. The device 700 further includes an encoder 724 for encoding protocol specification commands which are sent to stylus devices through the digitizer sensor 726 and/or using the one or more communication transceivers 730. The device 700 may further include a network adapter 736, which is a type of communication device. The device 700 may use the adapter and any other types of communication devices for establishing connections over a wide-area network (WAN) or local-area network (LAN). It should be appreciated that the network connections shown are exemplary and that other communications devices and means for establishing a communications link between the device 700 and other devices may be used.

The device 700 may include one or more input devices 734 such that a user may enter commands and information (e.g., a keyboard or mouse). These and other input devices may be coupled to the server by one or more interfaces 738 such as a serial port interface, parallel port, universal serial bus (USB), etc. The device 700 may further include a display 722 such as a touch screen display.

The device 700 may include a variety of tangible processor-readable storage media and intangible processor-readable communication signals. Tangible processor-readable storage can be embodied by any available media that can be accessed by the device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example stylus device configured to communicate with a digitizer of a host device includes a digitizer signal transceiver configured to communicate with the digitizer of the host device according to a first device specified communication protocol and a receiver configured to receive a protocol specification command indicating a second communication protocol for communicating with the digitizer of the host device. The protocol specification command is received during concurrent communication with the digitizer of the host device according to the first device specified communication protocol. The digitizer signal transceiver is further configured to communicate with the digitizer of the host device according to the second communication protocol.

An example stylus device of any preceding stylus device includes the protocol specification command being received from the digitizer of the host device according to the first device specified communication protocol.

An example stylus device of any preceding stylus device includes the protocol specification command being received from a BlueTooth transceiver of the host device.

An example stylus device of any preceding stylus device includes operational capabilities of the stylus device when interacting with the host device being different depending on whether the stylus device is communicating with the digitizer of the host device according to the first communication protocol as opposed to the second communication protocol.

An example stylus device of any preceding stylus device includes the protocol specification command indicating an additional communication protocol for communicating with the digitizer of the host device and a switch condition. The digitizer signal transceiver is further configured to communicate with the digitizer of the host device using the additional communication protocol responsive to detection of satisfaction of the switch condition An example stylus device of any preceding stylus device includes the protocol specification command indicating communication protocol parameters including at least one of a radiofrequency (RF) of a generated signal, a duration of a transmission window, a number of signals transmitted in a transmission window, a number of clocks added to a signal, a transmission duration, and a phase of a generated signal.

An example stylus device of any preceding stylus device includes the protocol specification command indicating a transmission window for the stylus device to begin communicating with the digitizer of the host device using the indicated second communication protocol.

An example stylus device of any preceding stylus device includes a sensors module communicatively coupled to the digitizer signal transceiver and configured to determine operational information. The digitizer signal transceiver is further configured to encode the determined operational information in a generated signal based on the indicated communication protocol, the digitizer signal transceiver transmitting the generated signal encoded with the operational information.

An example method for communicating between a stylus device and a digitizer of a host device includes communicating with the digitizer of the host device according to a first device specified communication protocol, receiving a protocol specification command indicating a second communication protocol for communicating with the digitizer of the host device, the protocol specification command received during concurrent communication with the digitizer of the host device according to the first device specified communication protocol, and communicating with the digitizer of the host device according to the second communication protocol.

Another example method of any preceding method includes the protocol specification command being received from the digitizer of the host device using the first device specified communication protocol.

Another example method of any preceding method includes the protocol specification command being received from a BlueTooth transceiver of the host device.

Another example method of any preceding method includes operational capabilities of the stylus device when interacting with the host device being different depending on whether the stylus device is communicating with the digitizer of the host device according to the first device specified communication protocol as opposed to the second communication protocol.

Another example method of any preceding method includes the protocol specification command indicating an additional communication protocol for communicating with the digitizer of the host device and a switch condition. The example method further includes detecting satisfaction of the switch condition and communicating with the digitizer of the stylus device according to the additional communication protocol.

Another example method of any preceding method includes the protocol specification command indicating communication protocol parameters including at least one of a radiofrequency (RF) of a signal, a duration of a transmission window, a number of signals transmitted in a transmission window, a number of clocks added to a signal, a transmission duration, and a phase of a signal.

Another example method of any preceding method includes the protocol specification command indicating a transmission window for the stylus device to begin communicating with the digitizer of the host device using the indicated second communication protocol.

An example system for communicating between a stylus device and a digitizer of a host device includes means for communicating with the digitizer of the host device according to a first device specified communication protocol, means for receiving a protocol specification command indicating a second communication protocol for communicating with the digitizer of the host device and support for the protocol specification command being received during concurrent communication with the digitizer of the host device according to the first device specified communication protocol, and means for communicating with the digitizer of the host device according to the second communication protocol.

An example system for communicating between a stylus device and a digitizer of a host device includes means for the protocol specification command being received from the digitizer of the host device using the first device specified communication protocol.

An example system for communicating between a stylus device and a digitizer of a host device includes means for the protocol specification command being received from a BlueTooth transceiver of the host device.

An example system for communicating between a stylus device and a digitizer of a host device includes support for operational capabilities of the stylus device when interacting with the host device being different depending on whether the stylus device is communicating with the digitizer of the host device according to the first device specified communication protocol as opposed to the second communication protocol.

An example system for communicating between a stylus device and a digitizer of a host device includes means for the protocol specification command indicating an additional communication protocol for communicating with the digitizer of the host device and a switch condition. The example system further includes means for detecting satisfaction of the switch condition and means for communicating with the digitizer of the stylus device according to the additional communication protocol.

An example system for communicating between a stylus device and a digitizer of a host device includes means for the protocol specification command indicating communication protocol parameters including at least one of a radiofrequency (RF) of a signal, a duration of a transmission window, a number of signals transmitted in a transmission window, a number of clocks added to a signal, a transmission duration, and a phase of a signal.

An example system for communicating between a stylus device and a digitizer of a host device includes means for the protocol specification command indicating a transmission window for the stylus device to begin communicating with the digitizer of the host device using the indicated second communication protocol.

An example host device configured to communicate with a stylus device includes a digitizer configured to communicate with the stylus device according to a first communication protocol specified by the host device, and a transmitter configured to transmit a protocol specification command to the stylus device during concurrent communication with the stylus device by the digitizer of the host device according to the first communication protocol, the protocol specification command indicating a second communication protocol for communicating with the digitizer of the host device.

Another example host device of any preceding host device includes the protocol specification command being transmitted according to the first communication protocol specified by the stylus device.

Another example host device of any preceding host device includes the protocol specification command indicating a transmission window for the stylus device to begin communicating with the digitizer of the host device using the indicated second communication protocol.

Another example host device of any preceding host device includes operational capabilities of the stylus device when interacting with the host device being different depending on whether the stylus device is communicating with the digitizer of the host device using the first communication protocol as opposed to the second communication protocol.

Another example host device of any preceding host device includes the protocol specification command indicating communication protocol parameters including at least one of a radiofrequency (RF) of a signal, a duration of a transmission window, a number of signals transmitted in a transmission window, a number of clocks added to a signal, a transmission duration, and a phase of a signal.

The implementations described herein are implemented as logical steps in one or more computer systems. The logical operations of the present implementations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A stylus device configured to communicate with a digitizer of a host device, the stylus device comprising:
a digitizer signal transmitter configured to communicate with the digitizer of the host device according to a first device specified communication protocol; and
a receiver configured to receive a protocol specification command from the digitizer of the host device according to the first device specified communication protocol, the protocol specification command indicating a second communication protocol for communicating with the digitizer of the host device and being received during concurrent communication with the digitizer of the host device according to the first device specified communication protocol, the digitizer signal transmitter further configured to communicate with the digitizer of the host device according to the second communication protocol.

2. The stylus device of claim 1 wherein operational capabilities of the stylus device when interacting with the host device are precluded depending on whether the stylus device is communicating with the digitizer of the host device according to the first device specified communication protocol as opposed to the second communication protocol.

3. The stylus device of claim 1 wherein the protocol specification command indicates an additional communication protocol for communicating with the digitizer of the host device and a switch condition, the digitizer signal transmitter further configured to communicate with the digitizer of the host device using the additional communication protocol responsive to detection of satisfaction of the switch condition.

4. The stylus device of claim 1 wherein the protocol specification command indicates communication protocol parameters including at least one of a radiofrequency (RF) of a generated signal, a duration of a transmission window, a number of signals transmitted in a transmission window, a number of clocks added to a signal, a transmission duration, and a phase of a generated signal.

5. The stylus device of claim 1 wherein the protocol specification command indicates a transmission window for the stylus device to begin communicating with the digitizer of the host device using the indicated second communication protocol.

6. The stylus device of claim 1 further comprising:
a sensors module communicatively coupled to the digitizer signal transmitter and configured to determine operational information, the digitizer signal transmitter further configured to encode the determined operational information in a generated signal based on the indicated communication protocol, the digitizer signal transmitter transmitting the generated signal encoded with the operational information.

7. The stylus device of claim 1 wherein the first device specified communication protocol defines wireless signal characteristics of a signal communicated from the stylus device to the digitizer of the host device at radiofrequency and the second communication protocol defines different wireless signal characteristics of the signal communicated from the stylus device to the digitizer of the host device at the radiofrequency, the wireless signal characteristics and the different wireless signal characteristics indicating how information is encoded in the signal communicated at the radiofrequency from the stylus device to the digitizer of the host device.

8. A method for communicating between a stylus device and a digitizer of a host device comprising:
communicating with the digitizer of the host device according to a first device specified communication protocol;
receiving a protocol specification command from the digitizer of the host device according to the first device specified communication protocol, the protocol specification command indicating a second communication protocol for communicating with the digitizer of the host device and being received during concurrent communication with the digitizer of the host device according to the first device specified communication protocol; and
communicating with the digitizer of the host device according to the second communication protocol.

9. The method of claim 8 wherein operational capabilities of the stylus device when interacting with the host device are precluded depending on whether the stylus device is communicating with the digitizer of the host device according to the first device specified communication protocol as opposed to the second communication protocol.

10. The method of claim 8 wherein the protocol specification command indicates an additional communication protocol for communicating with the digitizer of the host device and a switch condition, the method further comprising:
detecting satisfaction of the switch condition; and
communicating with the digitizer of the stylus device according to the additional communication protocol.

11. The method of claim 8 wherein the protocol specification command indicates communication protocol parameters including at least one of a radiofrequency (RF) of a signal, a duration of a transmission window, a number of signals transmitted in a transmission window, a number of clocks added to a signal, a transmission duration, and a phase of a signal.

12. The method of claim 8 wherein the protocol specification command indicates a transmission window for the stylus device to begin communicating with the digitizer of the host device using the indicated second communication protocol.

13. The method of claim 8 wherein the first device specified communication protocol defines wireless signal characteristics of a signal communicated from the stylus device to the digitizer of the host device at radiofrequency and the second communication protocol defines different wireless signal characteristics of the signal communicated from the stylus device to the digitizer of the host device at the radiofrequency, the wireless signal characteristics and the different wireless signal characteristics indicating how information is encoded in the signal communicated at the radiofrequency from the stylus device to the digitizer of the host device.

14. A host device configured to communicate with a stylus device, the host device comprising:
  a digitizer configured to communicate with the stylus device according to a first communication protocol specified by the host device and to transmit a protocol specification command to the stylus device during concurrent communication with the stylus device by the digitizer of the host device according to the first communication protocol, the protocol specification command indicating a second communication protocol for communicating with the digitizer of the host device, the digitizer further configured to communicate with the stylus device according to the second communication protocol.

15. The host device of claim 14 wherein the protocol specification command is transmitted according to the first communication protocol specified by the host device.

16. The host device of claim 14 wherein the protocol specification command indicates a transmission window for the stylus device to begin communicating with the digitizer of the host device using the indicated second communication protocol.

17. The host device of claim 14 wherein operational capabilities of the stylus device when interacting with the host device are precluded depending on whether the stylus device is communicating with the digitizer of the host device using the first device specified communication protocol as opposed to the second communication protocol.

18. The host device of claim 14 wherein the protocol specification command indicates communication protocol parameters including at least one of a radiofrequency (RF) of a signal, a duration of a transmission window, a number of signals transmitted in a transmission window, a number of clocks added to a signal, a transmission duration, and a phase of a signal.

19. The host device of claim 14 wherein the first device specified communication protocol defines wireless signal characteristics of a signal communicated from the stylus device to the digitizer of the host device at radiofrequency and the second communication protocol defines different wireless signal characteristics of the signal communicated from the stylus device to the digitizer of the host device at the radiofrequency, the wireless signal characteristics and the different wireless signal characteristics indicating how information is encoded in the signal communicated at the radiofrequency from the stylus device to the digitizer of the host device.

* * * * *